Figure 1:
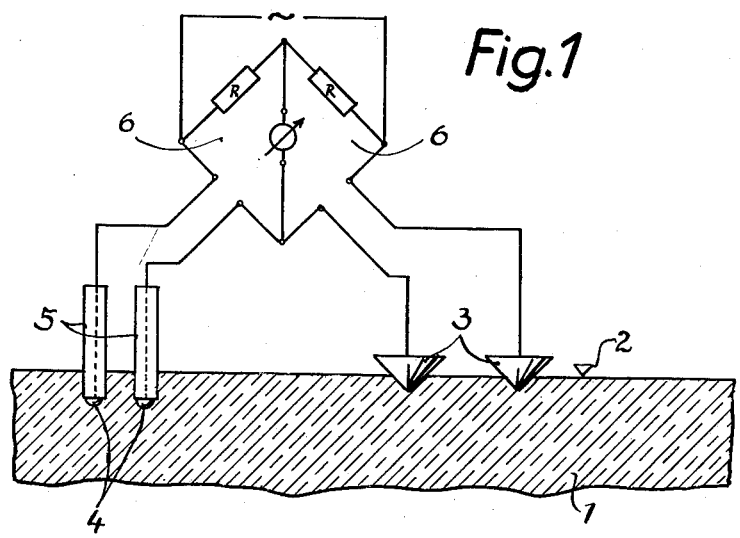

April 4, 1961  KARL-HEINZ HOFFMANN ET AL  2,977,797
DEVICE FOR MEASURING THE GLASS LEVEL
IN GLASS MELTING OVENS
Filed Aug. 15, 1956

Inventors:
Karl H. Hoffmann
Gustav Becker
By Cushman, Darby & Cushman
Attorneys

United States Patent Office 2,977,797
Patented Apr. 4, 1961

2,977,797

DEVICE FOR MEASURING THE GLASS LEVEL IN GLASS MELTING OVENS

Karl-Heinz Hoffmann, Essen - Altenessen, Germany (Paulinenstrasse 7, Essen, Germany), and Gustav Becker, Essen, Germany (Papenheide 6, Kirchhellen, Westphalia, Germany)

Filed Aug. 15, 1956, Ser. No. 604,099

Claims priority, application Germany Aug. 18, 1955

3 Claims. (Cl. 73—304)

The invention concerns a device for measuring, controlling and maintaining the glass level in melting troughs, working troughs or in the feeder.

The glass level controllers so far known are devices in which a dipped electrode of platinum is moved against the surface of the molten mass in such a way, that it is alternately dipped into, and raised out of, the molten mass several times a minute. The dipping electrode closes a circuit that terminates the movement of the electrode and simultaneously records the final position of the electrode. Due to their intricate structure, these devices are susceptible to trouble and often break down in practical operation. Moreover the formation of a glass drop sticking to the electrode is frequently the cause of inaccurate measurement and control of the glass level.

In another well-known glass level controller a nozzle blows air against the glass surface. The kinetic pressure thus exerted represents a measure of the height of the glass level.

However, in this nozzle, a part of the glass may be retained after accidental dipping of the nozzle into the liquid glass masses, so that the cross section is narrowed to such an extent that considerable mistakes are made in measuring the glass level. The present invention serves to avoid these disadvantages.

According to this invention, one or two electrodes of a resistant material (such as platinum) are inserted in the working trough or feeder at a certain distance and constant height so that an alteration of the glass level causes an extension or diminution of electrode surface dipped into the glass.

The glass level is then controlled by the electric resistance in the bridge between the electrode and earth or between the two electrodes, respectively.

The shape of the electrode used is influential to the sensitivity of the glass level indicator. Preferably, the two electrodes are formed of a sheet of platinum, which dips into the glass at an obtuse angle. The more obtuse the angle, the greater the sensitivity of the indicator, i.e. the greater the alteration of the glass-covered electrode-surface, when the glass level changes.

Still greater sensitivity is attained by the present invention through the use of conical electrodes with angles quite obtuse at the top.

Bridge connections according to the Wheatstone system usually serve to measure the change in the resistance to the electrodes in the glass bath.

With this arrangement, however, the resistance of the glass masses is not only dependent upon the size of the glass-covered electrode surface, but also on the respective glass temperature and composition. To steer clear of these effects on the measurement of the glass level, this invention employs another arrangement of electrodes dipping into the glass with their surface remaining constant so that the resistance is not modified by changes in the level of the glass surface.

If two different electrode chains of that type are switched together by means of a Wheatstone bridge so that only the differential resistance of the two electrode chains is measured, the effects of glass temperature and composition are balanced and the neutral branch of the bridge merely records the changes in the resistance as a function of the immersion depth of the one electrode chain in the glass.

Such a glass level measuring arrangement operates continuously. If an electric recording indicator is used in the neutral branch of the Wheatstone bridge, the glass level can be accurately and easily recorded. By the employment of an electric temperature control the invented glass level measuring device does not only record the glass level, but also the frit supply can be controlled by an appropriate switch, for instance, an on/off switch.

The glass level measuring devices so far in use merely operate in the feeder where the glass is kept at a constant level. But it is desirable to take direct glass level measurements and to arrange automatic control in the melting trough.

However, as the conventional glass level indicators are not capable to withstand the high temperatures in the melting trough in continuous operation, the present invention further provides for electrode cooling to permit such direct measurements in the melting trough at high temperature. For this purpose, the electrodes are hollowed and cooled by a current of water or air. Cooling may be so intensive that the liquid glass does not wet the electrodes any longer. Thus it is possible to apply essentially greater accuracy to glass level measuring and control, whereby any uncontrollable influences caused by the sticking of glass to the electrodes are avoided.

Measuring and controlling the glass level in the melting trough is advantageous in another respect. The time lag in the control line is reduced to such an extent that simpler and cheaper controlling gear will be sufficient.

In measuring and regulating the glass level it is further to be expected that the measurements taken may be erroneous due to foam formed on the molten glass. This disadvantage can be offset by the invention by placing round the immersion point of the electrodes a ring of ceramic material which partially immerges and keeps the foam off the electrode.

Owing to the relatively high viscosity of glass, the level in the feeder depends on the charge, even if the level in the melting trough remains constant. But as the glass is to be maintained at a constant level both in the melting trough and the feeder, the present invention embodies the following general arrangement:

The frit control for the melting trough is effected by the level indicator located in the same trough. In the working trough or in the individual feeders, the glass level is measured by additional instruments controlling the immersion depth of a displacer, in order to keep the glass level in each feeder constant in spite of fluctuations in the charge. The arrangement incorporated in the invention is shown by way of example in the drawing, in which Fig. 1 shows a switching diagram of a glass level measuring device according to the invention, with two electrode chains, and Fig. 2 the arrangement of two glass level measuring devices operating independently.

The level of molten mass 1 is marked 2. According to the arrangement shown in Fig. 1, two conical electrodes 3, preferably of platinum, are provided, which are partially dipped so that the size of the wetted surface changes with alterations in the level of the molten mass. Further, provision is made for two electrodes 4 which are dipped with their wetted surface remaining constant. Each of the electrodes is surrounded by a non-conducting shell 5.

The two electrode chains 3, 3 and 4, 4 are connected to a conventional Wheatstone bridge 6 in such a way, that the differences in the resistance of the two chains are measured against each other.

Figure 2:
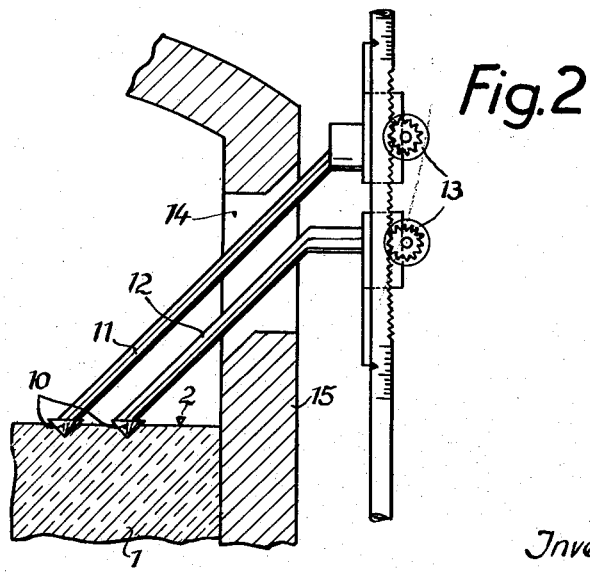

According to Fig. 2, two pairs of electrodes 10 are provided, the supports of which 11 and 12 are adjustable in height by means of a rack-and-pinion gear 13, and pass through a lateral opening 14 in the furnace wall 15.

Measuring device 10 has the advantage of being fitted with a regulator for the control of the frit. The other measuring device is merely used for the manual control of the glass level or serves as stand by, if the first device should fall out of operation.

What we claim is:

1. Apparatus for continuously measuring the level of molten glass in a glass melting furnace having a trough for carrying the molten glass comprising: a Wheatstone bridge arrangement, one arm of said bridge comprising a first pair of spaced electrodes immersed in the molten glass, the area of said first electrodes exposed to the molten glass being constant during any fluctuation in the glass level to provide a constant resistance therebetween; another arm of said bridge including a second pair of spaced electrodes disposed adjacent the surface of the molten glass and fixedly mounted relative to said trough, said second pair of electrodes being conical in shape whereby fluctuations of the glass level vary the area of said second electrodes in contact with the molten glass and thereby the resistance between said second electrodes varies with the fluctuation of glass levels; and means to compare the variable resistance between said second pair of electrodes against said constant resistance between said first pair of electrodes.

2. Apparatus for continuously measuring the level of molten glass in a glass melting furnace having a trough for carrying the molten glass comprising: a Wheatstone bridge arrangement, one arm of said bridge comprising a first pair of spaced electrodes immersed in the molten glass, said first pair of electrodes being partially enclosed in a non-conducting shell so as to present a predetermined small area in constant contact with the molten glass during substantially all levels of fluctuation in the glass level to provide a constant resistance therebetween; another arm of said bridge including a second pair of spaced electrodes disposed adjacent the surface of the molten glass and fixedly mounted relative to said trough, whereby fluctuations of the glass level vary the area of said second electrodes in contact with the molten glass and thereby the resistance between said second electrodes varies with the fluctuations of glass levels; and means to compare the variable resistance between said second pair of electrodes against said constant resistance between said first pair of electrodes.

3. Apparatus for continuously measuring the level of molten glass in a glass melting furnace having a trough for carrying the molten glass comprising: a Wheatstone bridge arrangement, one arm of said bridge comprising a first pair of spaced electrodes immersed in the molten glass, said first pair of electrodes being partially enclosed in a non-conducting shell so as to present a predetermined small area in constant contact with the molten glass during substantially all levels of fluctuation in the glass level to provide a constant resistance therebetween; another arm of said bridge including a second pair of spaced electrodes disposed adjacent the surface of the molten glass and fixedly mounted relative to said trough, said second pair of electrodes being conical in shape, whereby fluctuations of the glass level vary the area of said second electrodes in contact with the molten glass and thereby the resistance between said second electrodes varies with the fluctuations of glass levels; and means to compare the variable resistance between said second pair of electrodes against said constant resistance between said first pair of electrodes.

References Cited in the file of this patent

UNITED STATES PATENTS

| | | |
|---|---|---|
| 1,941,897 | Hiller | Jan. 2, 1934 |
| 1,961,893 | Wadman et al. | June 5, 1934 |
| 2,213,961 | Hunter | Sept. 10, 1940 |
| 2,485,579 | Elliott | Oct. 25, 1949 |
| 2,585,607 | Whitmore et al. | Feb. 12, 1952 |
| 2,692,368 | Mohier | Oct. 19, 1954 |
| 2,710,541 | Miller | June 14, 1955 |
| 2,824,449 | Childs | Feb. 25, 1958 |

FOREIGN PATENTS

| | | |
|---|---|---|
| 842,554 | Germany | June 30, 1952 |